United States Patent [19]

Ellis, Jr.

[11] Patent Number: 4,998,448

[45] Date of Patent: Mar. 12, 1991

[54] ALUMINUM DRIVESHAFT WITH BALANCING COMPOSITION

[75] Inventor: William P. Ellis, Jr., Toledo, Ohio

[73] Assignee: Dana Corporation, Toledo, Ohio

[21] Appl. No.: 457,376

[22] Filed: Jul. 3, 1990

Related U.S. Application Data

[63] Continuation of Ser. No. 818,388, Jan. 13, 1986, abandoned, which is a continuation of Ser. No. 718,190, Apr. 1, 1985, abandoned, which is a continuation of Ser. No. 586,631, Mar. 2, 1984, abandoned, which is a continuation of Ser. No. 371,790, Apr. 26, 1982, abandoned.

[51] Int. Cl.$^5$ .............. F16F 15/22; C03J 4/00; B60B 1/00

[52] U.S. Cl. .................. 74/573 R; 74/572; 301/5 B; 156/330

[58] Field of Search ............... 74/572–574; 301/5 B, 5 BA; 51/169; 156/330

[56] References Cited

U.S. PATENT DOCUMENTS

| | | | |
|---|---|---|---|
| 2,193,734 | 3/1940 | MacCracken | 301/5 B |
| 2,242,430 | 5/1941 | Kraft | 74/573 |
| 2,432,659 | 12/1947 | Criswell | 91/13 O R |
| 2,937,613 | 5/1960 | Larsh | 118/66 G |
| 3,130,075 | 4/1964 | Larsh | 118/66 G |
| 3,463,551 | 8/1969 | Clay | 74/573 |
| 3,506,478 | 4/1970 | Hudson et al. | 74/573 |
| 3,939,020 | 2/1976 | Caramanian | 74/573 R |
| 3,968,769 | 7/1976 | Gusarov et al. | 118/66 G |
| 3,996,883 | 12/1976 | Gusarov et al. | 118/66 G |
| 4,083,735 | 4/1978 | Caramanian | 74/573 R |

FOREIGN PATENT DOCUMENTS

| | | | |
|---|---|---|---|
| 55-6265 | 1/1980 | Japan | 74/573 R |
| 57-6143 | 1/1982 | Japan | 74/573 R |
| 2119063 | 11/1983 | United Kingdom | 74/573 R |

OTHER PUBLICATIONS

Ray Bolz and George Tuve, Handbook of Tables for Applied Engineering Science, 2nd Ed., CRC Press, 1976, pp. 132, 329, 330.

Harper, Charles A. (Ed.), Handbook of Plastics and Elastomers, McGraw-Hill Book Company, New York, N.Y., 1975, pp. 1-46 through 1-47 and 8-18 through 8-21.

Primary Examiner—Vinh T. Luong
Attorney, Agent, or Firm—MacMillan, Sobanski & Todd

[57] ABSTRACT

A balanced aluminum driveshaft includes a driveshaft, which is adapted to rotate in service about an axis therethrough but which is unbalanced relative to rotation about the axis, and a balancing composition for balancing the driveshaft. The balancing composition includes a polymer carrier of an adhesive composition which is cured by the application of ultraviolet light and a particulate material having a density higher than the adhesive composition dispersed therein. The particulate material includes metal particles having a particle size in the range of 0.080 to 0.120 inches and comprising 90% to 94% of said balancing composition by weight. Predetermined amounts of the balancing composition are adhered at selected locations on the outer surface of the driveshaft to balance the article for rotation about the axis.

12 Claims, 1 Drawing Sheet

ALUMINUM DRIVESHAFT WITH BALANCING COMPOSITION

This application is a continuation of application Ser. No. 06/718,190 filed Apr. 1, 1985, now abandoned, which was a continuation of application Ser. No. 06,586,631 filed Mar. 2, 1984, now abandoned, which was a continuation of application Ser. No. 06/371,790 filed Apr. 26, 1982, now abandoned.

BACKGROUND OF THE INVENTION

The present invention relates generally to a method for balancing mechanical components and more specifically to a method for balancing rotatable mechanical components such as vehicular drive train components.

Typically, it is often advantageous to balance selected components of a mechanical mechanism in order to reduce vibration of the components within the operating mechanism. This is especially true in the case of rotational components such as rotors or driveshafts.

A number of methods and devices have been proposed for balancing mechanical components. For example, some devices apply a quickly solidifying, liquid balancing material to a mechanical component such as a rotor. The liquid balancing material can be a molten metal, a resin, an adhesive, or a plastic material. Another balancing device utilizes either a molten or solid balancing material which is ejected at a relatively high velocity onto a rotor. Still another balancing apparatus utilizes balancing material initially in the form of a lead or plastic rod which is subsequently liquefied and fused onto the surface of a rotor.

One method which is often utilized in balancing vehicular drive train components consists of the welding of balancing slugs at selected locations along the driveshaft tubing. However, while such a method enables the attachment of a relatively large weight to the driveshaft, the welding operation causes microstructural changes in the metal in highly localized areas. These areas can act as stress risers and have an adverse effect on the service life of the driveshaft. The microstructural changes in the metal as a result of the welding operation are especially detrimental in instances where the driveshaft is constructed of aluminum.

SUMMARY OF THE INVENTION

This invention relates to an aluminum driveshaft, which is adapted to rotate in service about an axis through the driveshaft but is unbalanced relative to rotation about the axis, and a balancing means for balancing the driveshaft. The balancing means includes a polymer carrier of an adhesive composition which is cured by the application of ultraviolet light and a particulate material having a density higher than the adhesive composition dispersed therein. The particulate material includes metal particles having a particle size in the range of 0.080 to 0.120 inches and comprising 90% to 94% of said balancing means by weight. Predetermined amounts of the balancing means are adhered at selected locations on the outer surface of the driveshaft to balance the article for rotation about the axis.

A first embodiment of the balancing material is a dispersion of metal particles in a hardenable liquid polymer carrier, e.g., an epoxy resin. In use, a predetermined amount of the liquid balancing material, after the addition of a hardener, if required, is applied to selected locations on the driveshaft and the polymer carrier is hardened. Although a liquid epoxy polymer can be cured under ambient conditions, it is desirable to use heat, for example from an ultraviolet source or induction apparatus, to increase the cure rate, and correspondingly, the rate at which the balancing material can be applied.

A second embodiment of the balancing material is a mixture of a powdered polymer carrier such as a phenol formaldehyde resin and metal particles. The mixture can be applied to a driveshaft which has been heated to a comparatively low temperature, e.g., 300° F., at which the polymer carrier cures or it can be applied to and held in contact with the driveshaft and heated, for example by an induction heater, to cure the mixture onto the driveshaft.

The third embodiment of the balancing material is a plurality of metal particles which are individually encapsulated within a polymer carrier. The encapsulated metal particles, when the carrier is thermosetting, can be applied to and maintained in contact with the driveshaft while heat is applied, for example from an induction heater, to cure the carrier with the particles distributed therein onto the surface of the driveshaft. If the carrier is thermoplastic, heat can be applied to cause softening, and the carrier then allowed to cool for resolidification onto the driveshaft surface.

BRIEF DESCRIPTION OF THE DRAWINGS

The advantages of the present invention will be readily apparent to one skilled in the art from the following detailed description in combination with the accompanying drawings in which.

DESCRIPTION OF THE PREFERRED EMBODIMENTS

Figure 1:
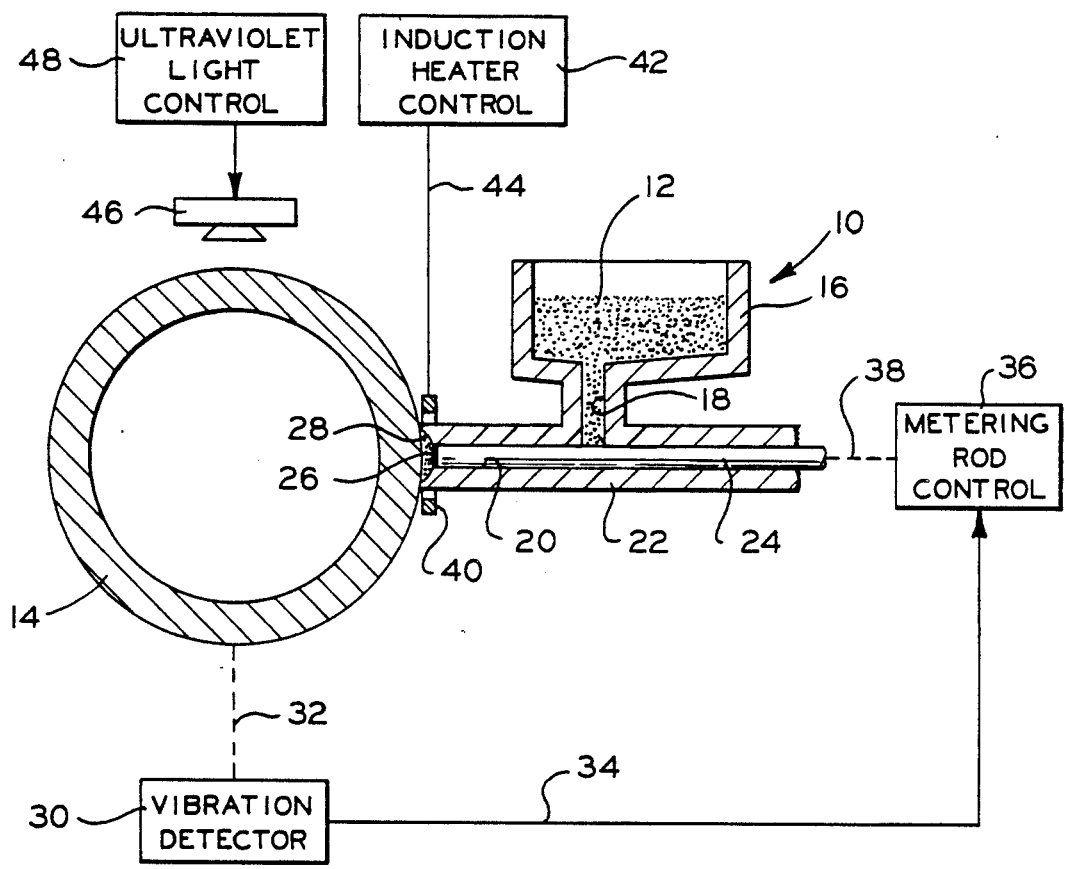
FIG. 1 is a schematic representation of an apparatus for applying a balancing material of the present invention to a rotatable component.

Referring to FIG. 1, there is shown a schematic representation of an apparatus 10 for applying a balancing material 12 of the present invention to a rotatable member such as a driveshaft 14. While not shown in the drawings, the balancing apparatus 10 can include means for supporting and rotating the driveshaft 14 about its longitudinal axis. The balancing apparatus 10 also includes a material reservoir 16 for holding a supply of the balancing material 12. The reservoir 16 has a lower outlet 18 which supplies the balancing composition to an inner passageway 20 formed in a metering tube 22. An elongate metering rod 24 is mounted for selective axial movement within the metering passageway 20 for controlling the application of the balancing material 12 to the driveshaft 14 through an outlet 26. The end of the metering tube 22 adjacent the outlet 26 is shaped to form, with the driveshaft 14, a segmented spherical mold 28. As will be discussed, the mold 28 can be utilized for maintaining the balancing material on the outer surface of the driveshaft 14 during the curing operation.

The balancing apparatus 10 can further include a vibration detector 30 which is coupled to sense the vibration of the rotating driveshaft 14 in order to determine the selected locations for application of the balancing material 12. The coupling between the driveshaft 14 and the vibration detector 30 is represented in FIG. 1 by the dashed line 32. The vibration detector 30 generates a signal representing the amount of detected vibration on a line 34 to a metering rod control 36. The metering rod control 36 utilizes this signal to determine the amount of balancing material 12 to be applied to the outer surface of the driveshaft 14. The metering rod control 36 is mechanically coupled to control the axial movement of the metering rod 24 within the metering tube 22. This mechanical coupling is represented in FIG. 1 by a dashed line 38. When it is desired to apply a predetermined amount of the balancing material to the driveshaft, the control 36 withdraws the tip of the rod 24 past the outlet 18 to enable a selected amount of the material to flow into the passageway 20. Next, the rod 24 is advanced to force the material 12 into the mold 28 and into contact with the driveshaft 14. While not shown in the drawings, means can be provided for automatically orientating the driveshaft 14 to receive the balancing material at the selected locations.

Although the balancing material 12 according to the present invention can utilize a polymer carrier which will cure on the surface of the driveshaft 14 under ambient conditions, it is preferable to use heat to increase the cure rate of the material. An example of one type of heat source is shown in FIG. 1 as a heater ring 40 which encompasses the mold 28 at the outlet of the metering tube 22 to generate heat by induction. The heater ring 40 is connected to an induction heater control 42 by a line 44. The heater control 42 can control the application of power to the ring 40 to regulate the cure rate of the material on the driveshaft 14.

Another example of an energy source which can be used is shown in FIG. 1 as an ultraviolet light 46 positioned proximate the outer surface of the driveshaft 14 and connected to an ultraviolet light control 48. After the balancing material has been applied to the driveshaft 14, the driveshaft can be rotated to move the material into the ultraviolet light beam whereby the material can be cured by the light.

Figure 2:
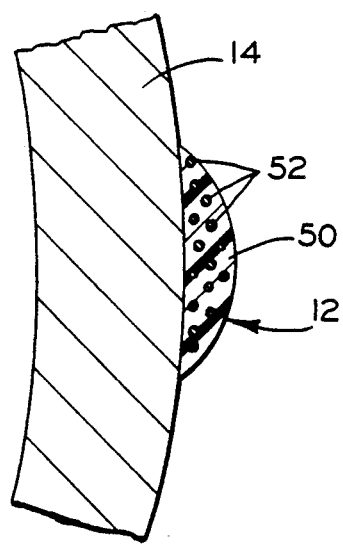
FIG. 2 is an enlarged sectional view through the rotatable component of FIG. 1 showing the balancing material adhered to the outer surface of the component.

Basically, the balancing material which is contemplated for use by the method of the present invention comprises a carrier such as an adhesive composition and a particulate material having a density higher than the adhesive composition dispersed therein. The adhesive composition can contain a thermoplastic or thermosetting resin which can be, for example, a epoxy resin, a vinyl resin, a phenol formaldehyde resin, an acrylonitrile-butadiene-styrene copolymer or a similar type material which can function as a carrier and which will suitably adhere to the component being balanced. As will be discussed, usually the adhesive composition is either a powder or a liquid, while typically the higher density particulate material dispersed therein comprises metal particles. As shown in the enlarged sectional view of FIG. 2, the cured balancing material 12 includes a solid or elastomeric adhesive composition 50 having a plurality of metal particles 52 dispersed therein. The following paragraphs are a discussion and description of several examples of balancing materials which can be used in the present invention.

A balancing material useful in practicing the present invention can be a liquid adhesive composition with metal particles dispersed therein. While the liquid composition can be an adhesive composition which cures under ambient conditions, cure is preferably accelerated by heat or light from a suitable source. An example of a liquid adhesive composition which can be cured by an ultraviolet light is that manufactured by Loctite Corporation and marketed under the tradename "Speed-bonder". Another example of adhesive composition which can be cured by an ultraviolet source is marketed by 3M Corporation under the designation #3190 Adhesive.

The balancing material can also be a mixture of metal particles with an adhesive composition which is initially in the form of a powder. Typically, the powdered adhesive can be either a thermosetting or a thermoplastic resin which requires the use of an external heat source to cause the material to cure onto the driveshaft, if thermosetting, or to cause the material to soften onto the driveshaft, if thermoplastic. In the latter case, the heating is discontinued after the material has softened so that it ultimately cools and resolidifies on the driveshaft. An example of a suitable powdered adhesive composition is that available from Polymer Corporation under the tradename "Corvel".

Finally, the balancing material of the present invention can be metal particles which are individually encapsulated in an adhesive composition. The encapsulated metal particles can be applied to and maintained in contact with the surface of the driveshaft 14 by the mold 28 while the heater ring 40 is activated to cure the material onto the driveshaft if the adhesive is thermosetting or to soften the adhesive, if thermoplastic. In the latter case, heating is ultimately discontinued so that the adhesive can resolidify on the driveshaft.

Examples of balancing materials which can be used in practicing the instant invention are set forth in the following table (Table A) solely for the purpose of illustrating and disclosing and not as limiting. These materials and their use constitute the best modes presently contemplated by the inventor, which is optimum depending upon what result is desired.

TABLE A

| | | COMPOSITION | | | |
| | | Particulate Material | | Adhesive | |
| Example | Nature of Balancing Material | No. 7½ Steel Shot | No. 7½ Lead Shot | Trade Designation | Amount |
| 1 | Shot in liquid dispersion | 50 g. | | Speed-bonder | Equal volume |
| 2 | Shot in liquid dispersion | | 50 g. | Speed-bonder | Equal volume |
| 3 | Shot in liquid dispersion | 50 g. | | 3M #3190 | Equal volume |
| 4 | Shot in liquid dispersion | | 50 g. | 3M #3190 | Equal volume |
| 5 | Powdered blend | 50 g. | | Corvel | 2× volume |
| 6 | Powdered blend | | 50 g. | Corvel | 2× volume |
| 7 | Coated metal particles | 50 g. | | Corvel | 0.030" thick coating |
| 8 | Coated metal particles | | 50 g. | Corvel | 0.030" thick coating |

While the above examples utilize an adhesive composition with metal particles dispersed therein, it will be appreciated that particulate materials other than metal can be used. The only requirement is that the material added to the adhesive have a density higher than that of the adhesive and be inert in the embodiment. Particulate silica, aluminum, and zirconia can all be used.

It will be appreciated that the size and proportions of particulate material which can be used may vary from application to application. For example, #7½ shot has a nominal diameter of approximately 0.095 inches. Also, the particular proportion of metal particles by weight which can be mixed with an adhesive composition will typically be limited by the overall size of the metal particles. The following tables (Table B and Table C) set forth the range of particle size and the percent by weight of particulate material which can be used.

TABLE B

| Particle Size (nominal diameter for a sphere of equal volume) | |
| --- | --- |
| Operable | 0.080 in. to 0.120 in. |
| Preferred | 0.090 in. to 0.110 in. |
| Optimum | 0.095 in. to 0.105 in. |

TABLE C

| | Percent by Weight | |
| --- | --- | --- |
| | Particulate Material | Adhesive |
| Operable | 90% to 94% | 6% to 10% |
| Preferred | 90.5% to 93.5% | 6.5% to 9.5% |
| Optimum | 91% to 93% | 7% to 9% |

In summary, the present invention encompasses a method of balancing a mechanical component with a balancing material comprising an adhesive composition and a material having a density higher than the adhesive dispersed therein. Such a balancing material has a number of advantages. First of all, such a material can adhere to a wide variety of materials. For example, it has been found that the material can be effectively utilized to balance drive train components constructed of aluminum. Also, since no welding operations are involved, the material can be applied to a metallic component without causing adverse microstructural changes in the component. This permits the application of the balancing material to locations on the component previously deemed unacceptable due to metallurgical and service life considerations. Furthermore, since a higher density material is added to the adhesive composition, the resultant balancing material has an overall average density which is greater than a balancing material which consists solely of the adhesive composition. Thus, less balancing material can be utilized to achieve a given amount weight addition.

In accordance with the provisions of the patent statutes, the formulations and method of the present invention have been described in what is now considered to represent its best embodiments. However, it should be understood that the invention may be practiced otherwise than as specifically illustrated and described without departing from the spirit or scope thereof in accordance with the attached claims.

What is claimed is:

1. An article comprising an aluminum driveshaft which is adapted to rotate in service about an axis through the driveshaft, but is unbalanced relative to rotation about the axis, and balancing means comprising a polymer carrier cured by the application of ultraviolet light of an adhesive composition and a particulate material having a density higher than said adhesive composition dispersed therein, said particulate material including metal particles having a particle size in the range of 0.080 to 0.120 inches and comprising 90% to 94% of said balancing means by weight, predetermined amounts of said balancing means being adhered at selected locations on the outer surface of the driveshaft to balance the article for rotation about the axis.

2. A mechanical component according to claim 1 wherein said adhesive composition includes a thermoset resin.

3. A mechanical component according to claim 1 wherein said adhesive composition includes a thermoplastic resin.

4. A mechanical component according to claim 1 wherein said metal particles comprise one of steel and lead shot.

5. A mechanical component according to claim 1 wherein said metal particles have a particle size in the range of 0.090 to 0.110 inches and comprise 90.5% to 93.5% of said balancing means by weight.

6. A mechanical component according to claim 1 wherein said metal particles have a particle size in the range of 0.095 to 0.105 inches and comprise 91% to 93% of said balancing means by weight.

7. A balanced aluminum driveshaft comprising:
an aluminum driveshaft which is adapted to rotate in service about an axis through the driveshaft, but is unbalanced relative to rotation about the axis; and
balancing means adhered at selected locations to the outer surface of said driveshaft for balancing it for rotation about the axis, said balancing means including a polymer carrier of an adhesive composition having a particulate material dispersed therein, said particulate material having a density higher than said adhesive composition and including metal particles having a particle size in the range of 0.080 to 0.120 inches and comprising 90% to 94% of said balancing means by weight.

8. A balanced aluminum driveshaft according to claim 7 wherein said adhesive composition includes a thermoset resin.

9. A balanced aluminum driveshaft according to claim 7 wherein said adhesive composition includes a thermoplastic resin.

10. A balanced aluminum driveshaft according to claim 7 wherein said metal particles comprise one of steel and lead shot.

11. A balanced aluminum driveshaft according to claim 7 wherein said metal particles have a particle size in the range of 0.090 to 0.110 inches and comprise 90.5% to 93.5% of said balancing means by weight.

12. A balanced aluminum driveshaft according to claim 7 wherein said metal particles have a particle size in the range of 0.095 to 0.105 inches and comprise 91% to 93% of said balancing means by weight.

* * * * *